(12) United States Patent
Scavezze et al.

(10) Patent No.: US 10,674,142 B2
(45) Date of Patent: *Jun. 2, 2020

(54) OPTIMIZED OBJECT SCANNING USING SENSOR FUSION

(71) Applicant: Microsoft Technology Licensing, LLC, Redmond, WA (US)

(72) Inventors: Michael Scavezze, Bellevue, WA (US); Arthur Tomlin, Kirkland, WA (US); Rui Cai, Beijing (CN); Zhiwei Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,182

(22) Filed: Apr. 9, 2019

(65) Prior Publication Data
US 2019/0379885 A1      Dec. 12, 2019

Related U.S. Application Data

(63) Continuation of application No. 15/017,799, filed on Feb. 8, 2016, now Pat. No. 10,257,505.

(51) Int. Cl.
| | |
|---|---|
| *G06T 19/00* | (2011.01) |
| *H04N 13/344* | (2018.01) |
| *H04N 13/128* | (2018.01) |
| *G06T 7/30* | (2017.01) |
| *G06T 7/70* | (2017.01) |
| *G06T 7/55* | (2017.01) |

(Continued)

(52) U.S. Cl.
CPC ............ *H04N 13/344* (2018.05); *G06T 7/30* (2017.01); *G06T 7/55* (2017.01); *G06T 7/70* (2017.01); *G06T 17/10* (2013.01); *H04N 13/128* (2018.05); *H04N 13/239* (2018.05); *G06T 2207/10016* (2013.01); *G06T 2207/10021* (2013.01); *G06T 2207/10028* (2013.01); *G06T 2207/30244* (2013.01)

(58) Field of Classification Search
CPC .. H04N 13/344; H04N 13/128; H04N 13/239; G06T 7/55; G06T 17/10; G06T 7/70; G06T 7/30; G06T 2207/10016; G06T 2207/10021; G06T 2207/30244; G06T 2207/10028

See application file for complete search history.

(56) References Cited

U.S. PATENT DOCUMENTS

| | | | |
|---|---|---|---|
| 9,865,089 B2 * | 1/2018 | Burns | ............ G06F 3/012 |
| 9,904,055 B2 * | 2/2018 | Burns | ......... G02B 27/0093 |
| 2014/0267254 A1 * | 9/2014 | Sievert | ............ G06T 17/05 |
| | | | 345/420 |

* cited by examiner

*Primary Examiner* — Howard D Brown, Jr.
(74) *Attorney, Agent, or Firm* — Mark K. Young; Mayer & Williams

(57) ABSTRACT

Sensor fusion is utilized in an electronic device such as a head mounted display (HMD) device that has a sensor package equipped with different sensors so that information that is supplemental to captured 2D images of objects or scenes in a real world environment may be utilized to determine an optimized transform of image stereo-pairs and to discard erroneous data that would otherwise prevent successful scans used for construction of a 3D model in, for example, virtual world applications. Such supplemental information can include one or more of world location, world rotation, image data from an extended field of view (FOV), or depth map data.

20 Claims, 9 Drawing Sheets

(51) Int. Cl.
*H04N 13/239* (2018.01)
*G06T 17/10* (2006.01)

OPTIMIZED OBJECT SCANNING USING SENSOR FUSION

CROSS-REFERENCE TO RELATED APPLICATION

This application is a continuation of U.S. Ser. No. 15/017,799 filed Feb. 8, 2016, entitled, "OPTIMIZED OBJECT SCANNING USING SENSOR FUSION", now U.S. Pat. No. 10,257,505, incorporated herein by reference in its entirety.

BACKGROUND

Object scanning can serve to convert a plurality of two-dimensional (2D) images of an object into a three-dimensional (3D) computationally-described model. One particular object scanning technique makes use of feature points on the object in order to determine how to combine the multiple 2D images into the 3D model. However, in some cases applications of this technique may be sub-optimal because objects without sufficient detail may be difficult to scan.

SUMMARY

Sensor fusion is utilized in an electronic device such as a head mounted display (HMD) device that has a sensor package equipped with different sensors so that information that is supplemental to captured 2D images of objects or scenes in a real world environment may be utilized to determine an optimized transform of image stereo-pairs and to discard erroneous data that would otherwise prevent successful scans used for construction of a 3D model in, for example, virtual world applications. Such supplemental information can include one or more of world location, world rotation, image data from an extended field of view (FOV), or depth map data.

In various illustrative examples, world tracking information from a tracking camera (i.e., image sensor) and/or an inertial sensor can provide an initial point for pose optimization and incorrect poses can be discarded when a calculated pose disagrees with a tracked position and rotation. An extended FOV camera may be utilized for 2D pose determination while a high-resolution camera can capture 2D images with additional unique detail that may be used to stitch images together for the 3D model. The 2D image capture may be triggered at particular times to enable further scanning optimization. For example, world tracking may be used to determine motion of the device so that images can be captured when the device is still or has the least motion to minimize the effects of blur. World tracking may also enable the 2D images to be captured at evenly-spaced positions in the real world environment to increase the quality of the constructed 3D model because of the similar error characteristics in the depth maps generated at each of the respective positions.

By employing sensor fusion to utilize the supplemental information from multiple sensors, more robust and accurate data is available when constructing the 3D model as compared to solely using inertial data to provide hints on how to combine the 2D images. In addition, object scanning using sensor fusion can improve operation of the electronic device itself in typical applications by enabling computing resources to be utilized more efficiently. For example, pose optimization from world tracking and the discarding of incorrect poses can reduce processing iterations and memory utilization when identifying local minima for a given 3D model. Similarly, 3D model construction using fewer, but evenly-spaced, images can result in decreased processor utilization and memory consumption.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like references indicate like elements in the drawings. Elements are not drawn to scale unless otherwise indicated.

DETAILED DESCRIPTION

Figure 1:
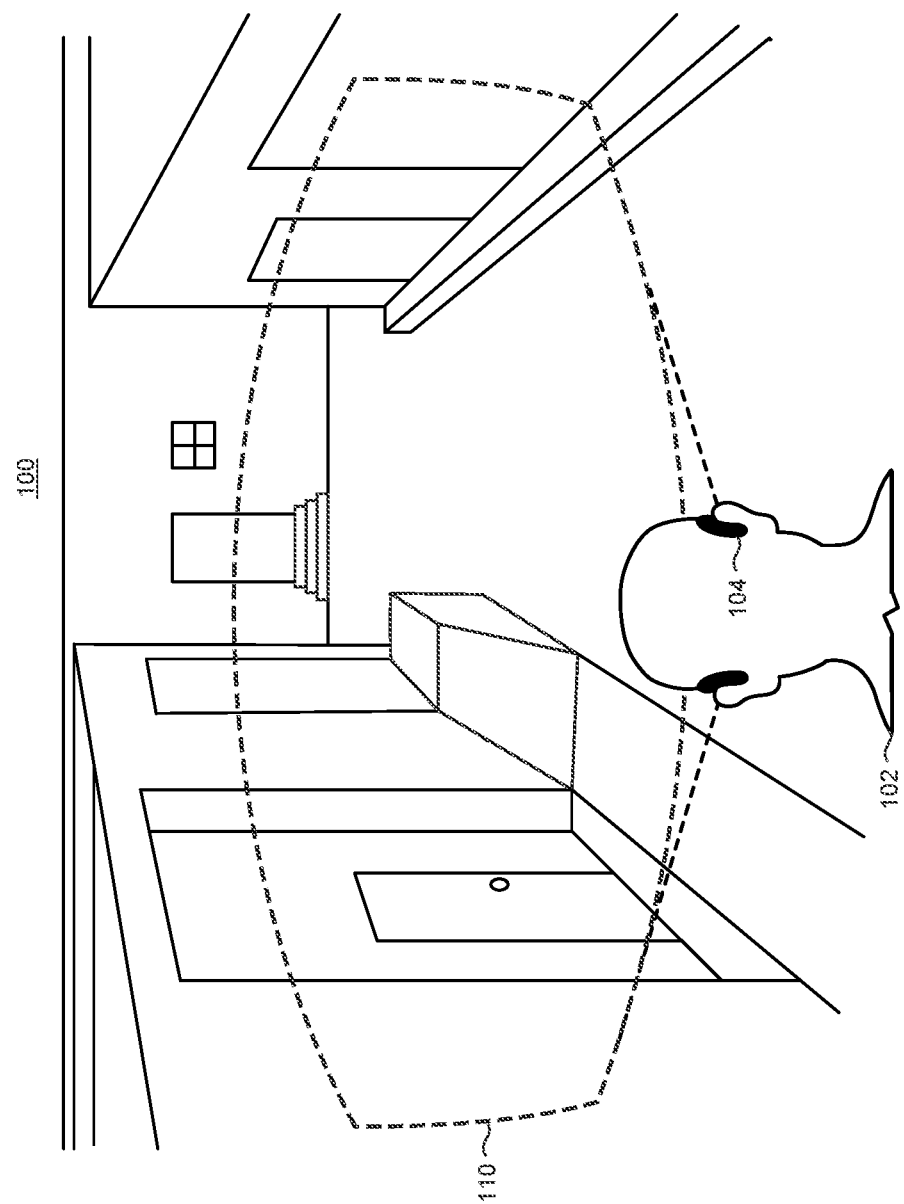
FIG. 1 shows an illustrative virtual reality environment, a portion of which is rendered within the field of view of a user of an HMD device.
Figure 2:
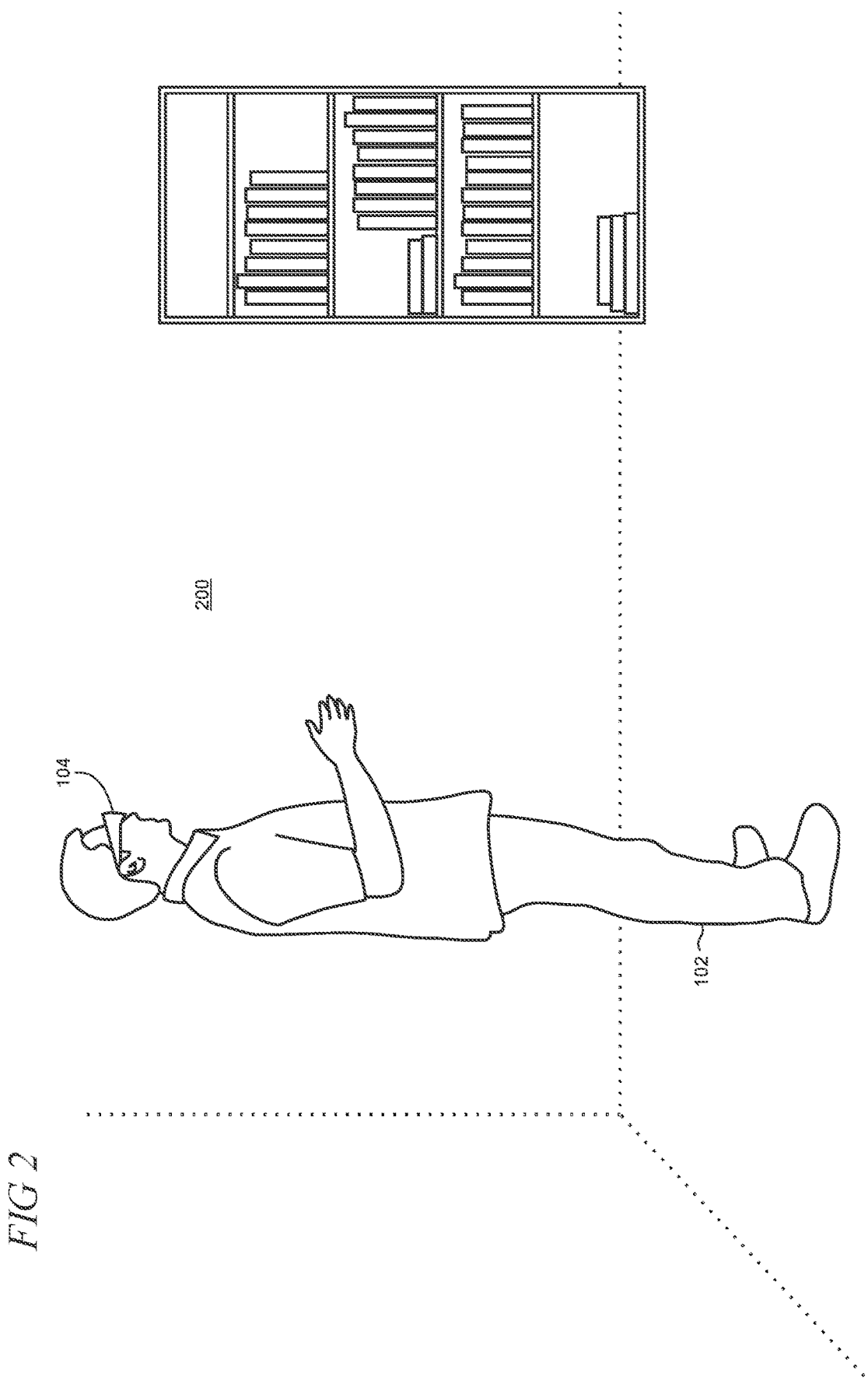
FIG. 2 shows an illustrative real world environment in which a user of an HMD device is located.

Users can explore, navigate, and move within a mixed reality or virtual reality environment rendered by a head mounted display (HMD) device by moving (e.g., through some form of locomotion) within a corresponding real world, physical environment or space. In an illustrative example, as shown in FIG. 1, a user 102 can employ an HMD device 104 to experience a virtual reality environment 100 that is rendered visually in three dimensions (3D) and may include audio and/or tactile/haptic sensations in some implementations. In this particular non-limiting example, an application executing on the HMD device 104 supports a virtual reality environment 100 that includes city streets with various buildings, stores, etc. As the user changes the position or orientation of his head and/or moves within the physical real world environment 200 shown in FIG. 2, his view of the virtual reality environment 100 can change. The field of view (represented by the dashed area 110 in FIG. 1) can be sized and shaped and other characteristics of the device can be controlled to make the HMD device experience visually immersive to provide the user with a strong sense of presence in the virtual world. While a virtual reality environment is shown in FIG. 1 and described herein, the presently described principles can also be applied to mixed reality environments and scenarios.

Figure 3:
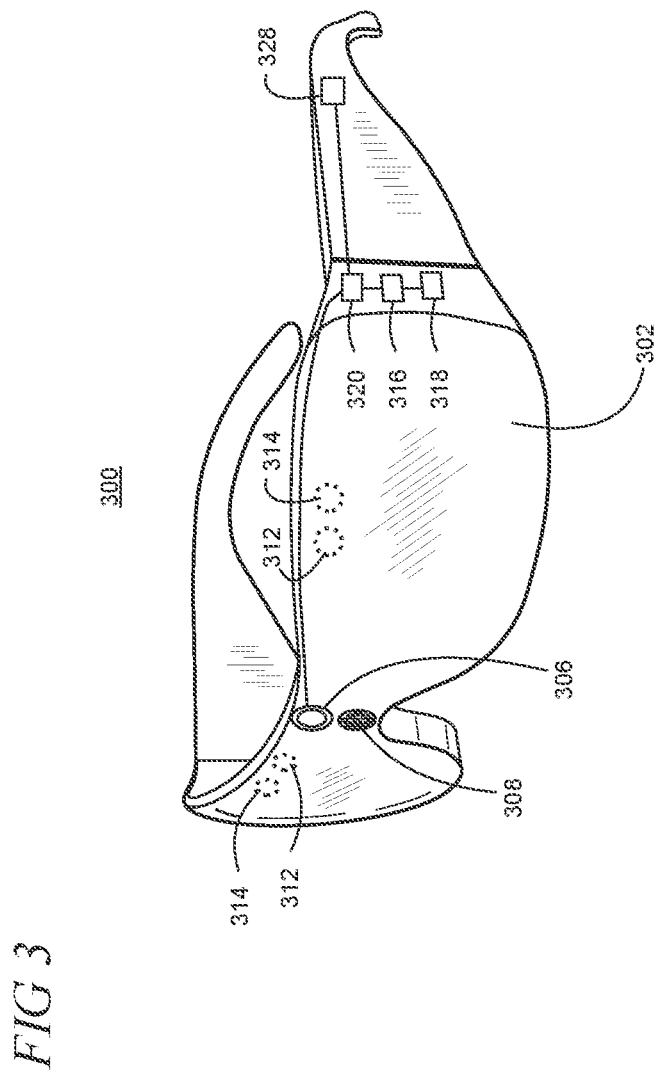
FIG. 3 is a pictorial view of an illustrative example of a virtual reality or mixed reality HMD device.
Figure 4:
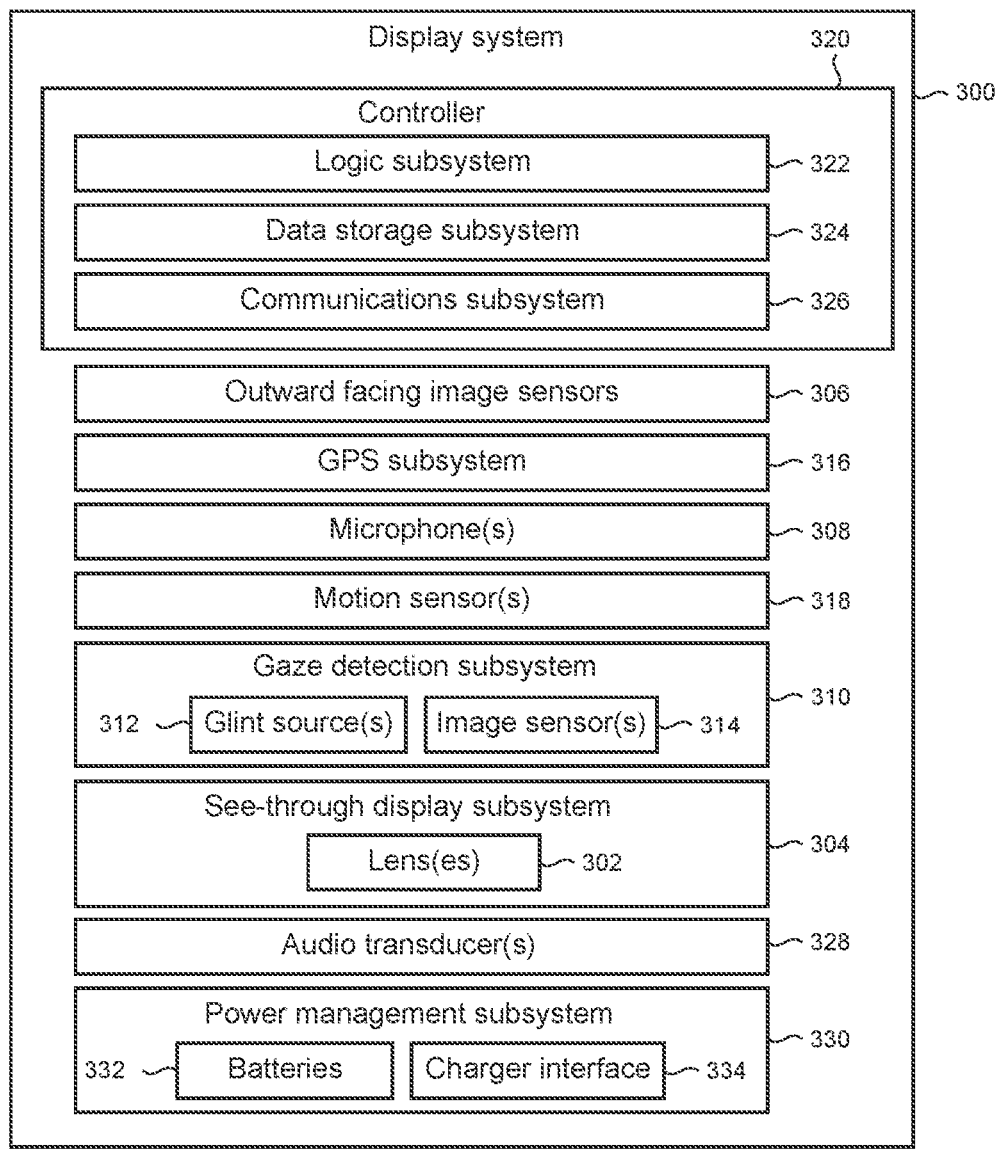
FIG. 4 shows a functional block diagram of an illustrative example of a virtual reality or mixed reality HMD device.

A virtual reality or mixed reality display device may take any suitable form, including but not limited to near-eye devices such as the HMD device 104 and/or other portable/mobile devices. FIG. 3 shows one particular illustrative example of a see-through, mixed reality display system 300, and FIG. 4 shows a functional block diagram of the system 300. However, it is emphasized that while a see-through display may be used in some implementations, an opaque (i.e., non-see-through) display using a camera-based pass-through or outward facing sensor, for example, may be used in other implementations.

Display system 300 comprises one or more lenses 302 that form a part of a see-through display subsystem 304, such that images may be displayed using lenses 302 (e.g. using projection onto lenses 302, one or more waveguide systems incorporated into the lenses 302, and/or in any other suitable manner). Display system 300 further comprises one or more outward-facing image sensors 306 configured to acquire images of a background scene and/or physical environment being viewed by a user, and may include one or more microphones 308 configured to detect sounds, such as voice commands from a user. Outward-facing image sensors 306 may include one or more depth sensors and/or one or more two-dimensional image sensors. In alternative arrangements, as noted elsewhere herein, a virtual reality or mixed reality display system, instead of incorporating a see-through display subsystem, may display mixed reality images through a viewfinder mode for an outward-facing image sensor.

The display system 300 may further include a gaze detection subsystem 310 configured for detecting a direction of gaze of each eye of a user or a direction or location of focus, as described above. Gaze detection subsystem 310 may be configured to determine gaze directions of each of a user's eyes in any suitable manner. For example, in the illustrative example shown, a gaze detection subsystem 310 includes one or more glint sources 312, such as infrared light sources, that are configured to cause a glint of light to reflect from each eyeball of a user, and one or more image sensors 314, such as inward-facing sensors, that are configured to capture an image of each eyeball of the user. Changes in the glints from the user's eyeballs and/or a location of a user's pupil, as determined from image data gathered using the image sensor(s) 314, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 310 may have any suitable number and arrangement of light sources and image sensors. In some implementations, the gaze detection subsystem 310 may be omitted.

The display system 300 may also include additional sensors. For example, display system 300 may comprise a global positioning system (GPS) subsystem 316 to allow a location of the display system 300 to be determined. This may help to identify real world objects, such as buildings, etc. that may be located in the user's adjoining physical environment.

The display system 300 may further include one or more motion sensors 318 (e.g., inertial, multi-axis gyroscopic or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 306. The use of motion data may allow changes in gaze location to be tracked even if image data from outward-facing image sensor(s) 306 cannot be resolved.

In addition, motion sensors 318, as well as microphone(s) 308 and gaze detection subsystem 310, also may be employed as user input devices, such that a user may interact with the display system 300 via gestures of the eye, neck and/or head, as well as via verbal commands in some cases. It may be understood that sensors illustrated in FIGS. 3 and 4 and described in the accompanying text are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 300 can further include a controller 320 having a logic subsystem 322 and a data storage subsystem 324 in communication with the sensors, gaze detection subsystem 310, display subsystem 304, and/or other components through a communications subsystem 326. The communications subsystem 326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 324 may include instructions stored thereon that are executable by logic subsystem 322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 300 is configured with one or more audio transducers 328 (e.g., speakers, earphones, etc.) so that audio can be utilized as part of an augmented reality experience. A power management subsystem 330 may include one or more batteries 332 and/or protection circuit modules (PCMs) and an associated charger interface 334 and/or remote power interface for supplying power to components in the display system 300.

It may be appreciated that the depicted display devices 104 and 300 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 5:
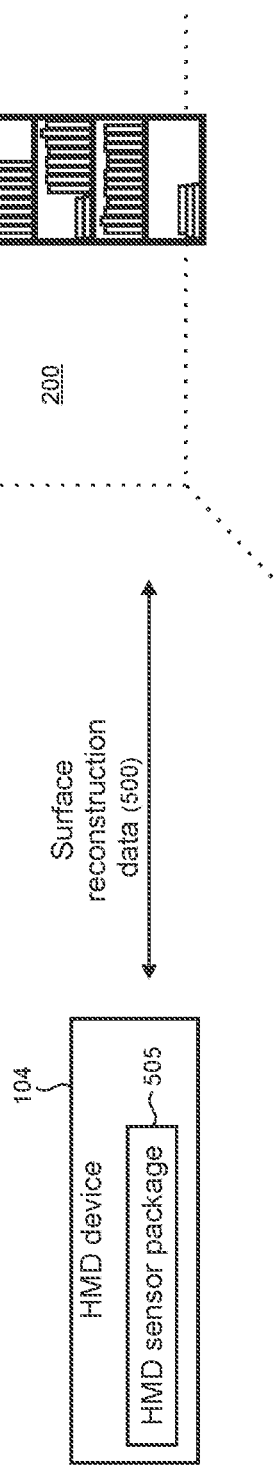
FIG. 5 depicts surface reconstruction data associated with a real world environment being captured by an HMD device.

The HMD device 104 is configured to obtain surface reconstruction data 500, as shown in FIG. 5, by using an integrated sensor package 505 to sense the user's position within the physical environment 200. The sensor package, as described in more detail below, can include a depth sensor or depth-sensing camera system. In alternative implementations, depth data can be derived using suitable stereoscopic image analysis techniques.

Figure 6:
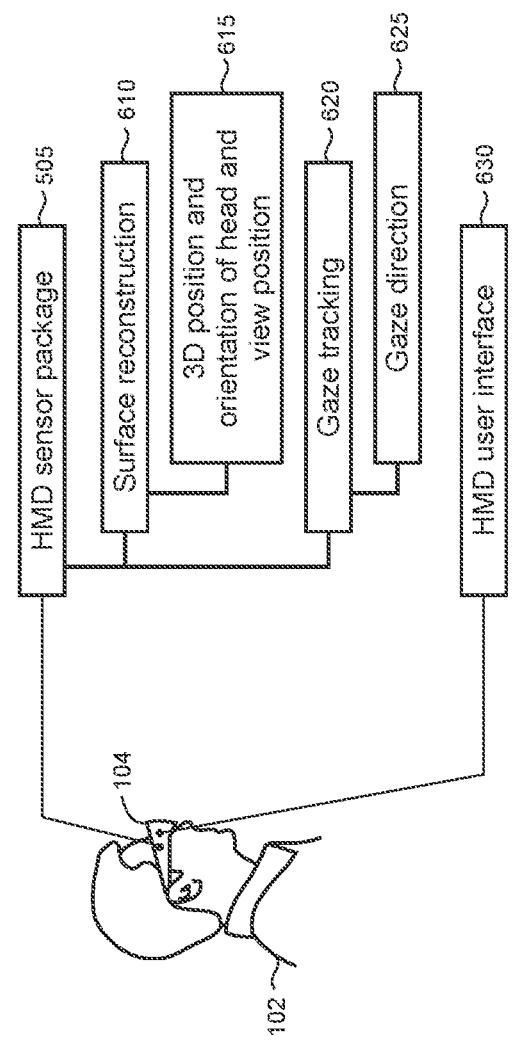
FIG. 6 shows an illustrative user interface supported by an HMD device and illustrative data provided by an HMD sensor package.

As shown in FIG. 6, the sensor package 505 can support various functionalities including surface reconstruction 610. Surface reconstruction may be utilized, for example, in constructing a virtual 3D model of subjects/objects, a physical environment, or portions thereof. Surface reconstruction may also be utilized, in some applications, for world and/or head tracking to determine the 3D (three-dimensional) position and orientation 615 of the user's head within the physical real world environment 200 including head pose so that a view position of the virtual world can be determined. In some cases, surface reconstruction may be utilized for world tracking by supplementing other head tracking techniques which use, for example, inertial sensors. World tracking using surface reconstruction or other camera-based techniques with tracking cameras and similar sensors can be utilized to determine world location and/or world rotation of the HMD device within the physical environment 200 that is utilized as supplemental information. World tracking can also be determined using other sensors, or combination of sensors using fusion in some cases, although inertial sensor data from an inertial measurement unit (IMU) can be inaccurate in some cases when used alone. Non-limiting examples of these include a magnetic 6-degrees-of-freedom position sensor, a lighthouse-based laser-scanning system that sweeps the room, or photodiodes on the tracked object being triggered at specific moments in time, allowing the pose to be calculated.

The sensor package can also support gaze tracking 620 in some implementations to ascertain a direction of the user's gaze 625 which may be used along with the head position and orientation data. The HMD device 104 may further be configured to expose a user interface (UI) 630 that can display system messages, prompts, and the like as well as expose controls that the user may manipulate. The controls can be virtual or physical in some cases. The UI 630 may also be configured to operate with sensed gestures and voice using, for example, voice commands or natural language.

Figure 7:
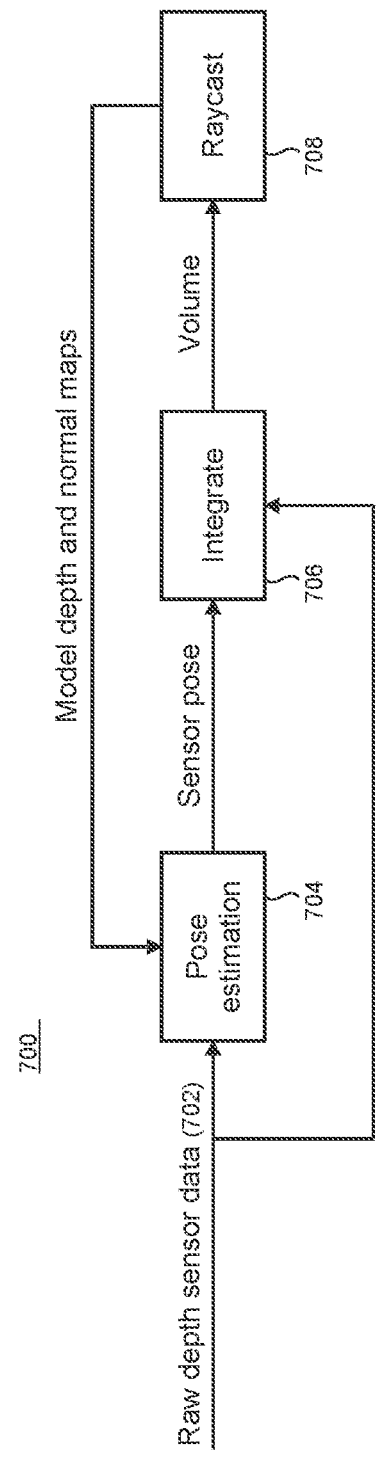
FIG. 7 shows a block diagram of an illustrative surface reconstruction pipeline.

FIG. 7 shows an illustrative surface reconstruction data pipeline 700 for obtaining surface reconstruction data for the real world environment 200. It is emphasized that the disclosed technique is illustrative and that other techniques and methodologies may be utilized depending on the requirements of a particular implementation. Raw depth sensor data 702 is input into a 3D (three-dimensional) pose estimate of the sensor (block 704). Sensor pose tracking can be achieved, for example, using ICP (iterative closest point) alignment between the predicted surface and current sensor measurement. Each depth measurement of the sensor can be integrated (block 706) into a volumetric representation using, for example, surfaces encoded as a signed distance field (SDF). Using a loop, the SDF is raycast (block 708) into the estimated frame to provide a dense surface prediction to which the depth map is aligned. Thus, when the user 102 looks around the virtual world, surface reconstruction data associated with the real world environment 200 can be collected and analyzed. One use of the surface reconstruction data may be to determine the user's head position and orientation.

In an illustrative example, scanning is performed with a combination of multiple 2D images of an object in order to form a 3D mesh or other computational model representing the scanned object. For example, identifiable feature points on the object are located in the various views. The change of position of the feature points from one 2D image to another and the change of position between the various feature points within successive 2D images can be used to infer the location of the feature points, and therefore the surface of the object, in three dimensions.

Positional data describing the location and orientation of the HMD device 104 is used in pose estimation 704. For example, position and orientation data can be derived by sensor package 505, among which can include motion sensor(s) 318, and/or GPS subsystem 316. Furthermore, sensor data such as position data, image data (including 2D and 3D depth image data), can include timestamp metadata. Therefore, sensor data of various types (e.g., image, position, and/or motion) can be correlated in time.

Data provided by motion sensors 318 may be used to provide hints on how to combine the images. However, data provided by motion sensors 318, for example an IMU, alone is often not robust or accurate, as noted above. In an illustrative implementation, the position, orientation, and rotation data from any of the sensor package 505 components is used as an initial starting point to perform the position integration based on the variety of 2D images, as described above. Accordingly, the entire position computation is completed faster and more efficiently by use of the position information.

In some implementations, the capture of the 2D images for the 3D computational model can be improved by only capturing images at optimal times, in view of certain motion, position, and/or orientation data. For example, in the case where a 2D image is captured by a rolling shutter camera, a higher quality image is obtained when the camera is not in motion because distortion or blurring is avoided. Additionally, in certain low-light situations, the exposure duration may be longer to achieve adequate brightness of image. In the low-light case as well, there will be less blur in the 2D image when the camera is not moving or is moving more slowly. A maximum threshold of acceptable motion can be set to determine an acceptable image. Alternatively, a threshold can be determined by comparison of motion sensor 318 data contemporaneous to image capture data, which can be used to choose the images with a lowest relative contemporaneous motion among several. The chosen 2D images will tend to be of higher quality, acuity and/or sharpness.

Figure 8:
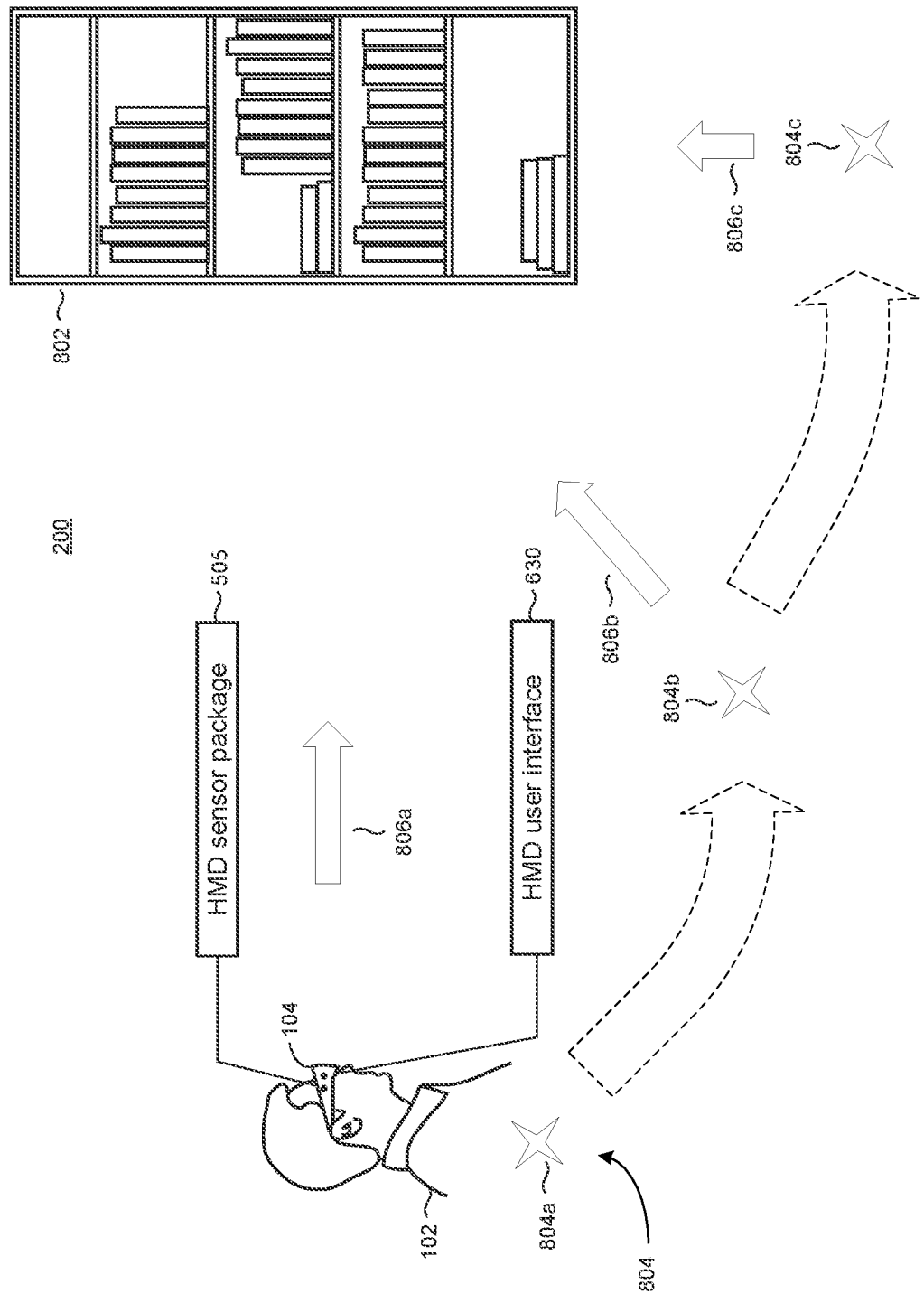
FIG. 8 shows the capture of a plurality of images of an object in a real world environment of a user.

FIG. 8 shows an illustrative example in which the user 102 operates the HMD device 104 to capture a plurality of images of an object 802 in the real world environment 200 of the user 102. The image data can be captured by the sensor package 505, for example, using image sensors 306 and be used as the basis to construct a 3D mesh representation of the object 802 for incorporation and use in the virtual environment 100. Moreover, the HMD device 104 may guide or direct the user 102 how to move in relation to the object 802 in order to capture better input images, for example, through the user interface 630.

In some implementations, images are selected to use in the 3D model construction based on position and orientation information derived from the sensor package, for example motion sensors 318. More particularly, images that are taken from positions or vantage points, generally 804, or individually 804*a*, 804*b*, 804*c*, etc. can be utilized. The positions 804 of the images used in the model construction are spaced from one another. In some cases, the positions 804 may be evenly spaced around the object 802, or as near to even spacing as can be obtained based on the position metadata accompanying a plurality of images including the object 802. Moreover, the combination of position 804 and orientation of the HMD device 104 with respect to the object 802 is considered a pose, indicated in FIG. 8 by one of arrows 806*a*, 806*b*, or 806*c*. Evenly spaced, regular poses can yield a better quality of synthesis of the resulting 3D mesh that models the object 802, due at least in part to similar error characteristics amongst generated depth maps.

The scanning process for the object 802 may thus be improved using knowledge of the camera location for each captured image, by a precise position and orientation of the camera. Constructing a 3D model using fewer images, while having those approximately evenly spaced, may result in decreased processing time and memory consumption, which can improve the overall performance of the HMD device 104. Additionally, knowing a previously optimized location and orientation of the camera relative to a specific coordinate frame shared with a subsequent pose, or orientation and location of the camera, provides a starting point for optimizing the relative transform between stereo image pairs. For example, if one minimizes the global error of the system, it can be at the expense of error between individual poses. These poses act as a seed for the optimization problem using just the salient data for 3D object reconstruction. This knowledge may help prevent sparse features causing optimization into spurious local minima. The result can be more precise and accurate image-to-image pose calculations, or even reference for the rejection of outlier data. Accordingly, less iteration is needed to reach the correct minimum.

In another illustrative example, plural image sensors 306 may be combined in the HMD device 104 to give a composite extended field of view (FOV) providing increased angular resolution of the real world environment, or a single image sensor may be configured with an extended FOV. Such extended FOV may enable the HMD device 104 to more robustly know where the scanning camera is in the real world environment 200, even when the scanning camera is very close to the object 802, and/or the object 802 does not feature enough unique detail to stitch a given image together with other adjacent images. An extended FOV gives the system a more robust ability to provide estimates of similar accuracy and precision as lower FOV sensors. This allows the use of data that otherwise may not be usable due to an inability to localize the content. As a result in some implementations, the user 102 can position the scanning camera closer to the object 802 during scanning to capture more detail in the resulting model. In other implementations, the scanning camera may be configured as a higher-quality camera and/or be configured with higher imaging resolution for capturing additional and/or fine detail in the object.

Figure 9:
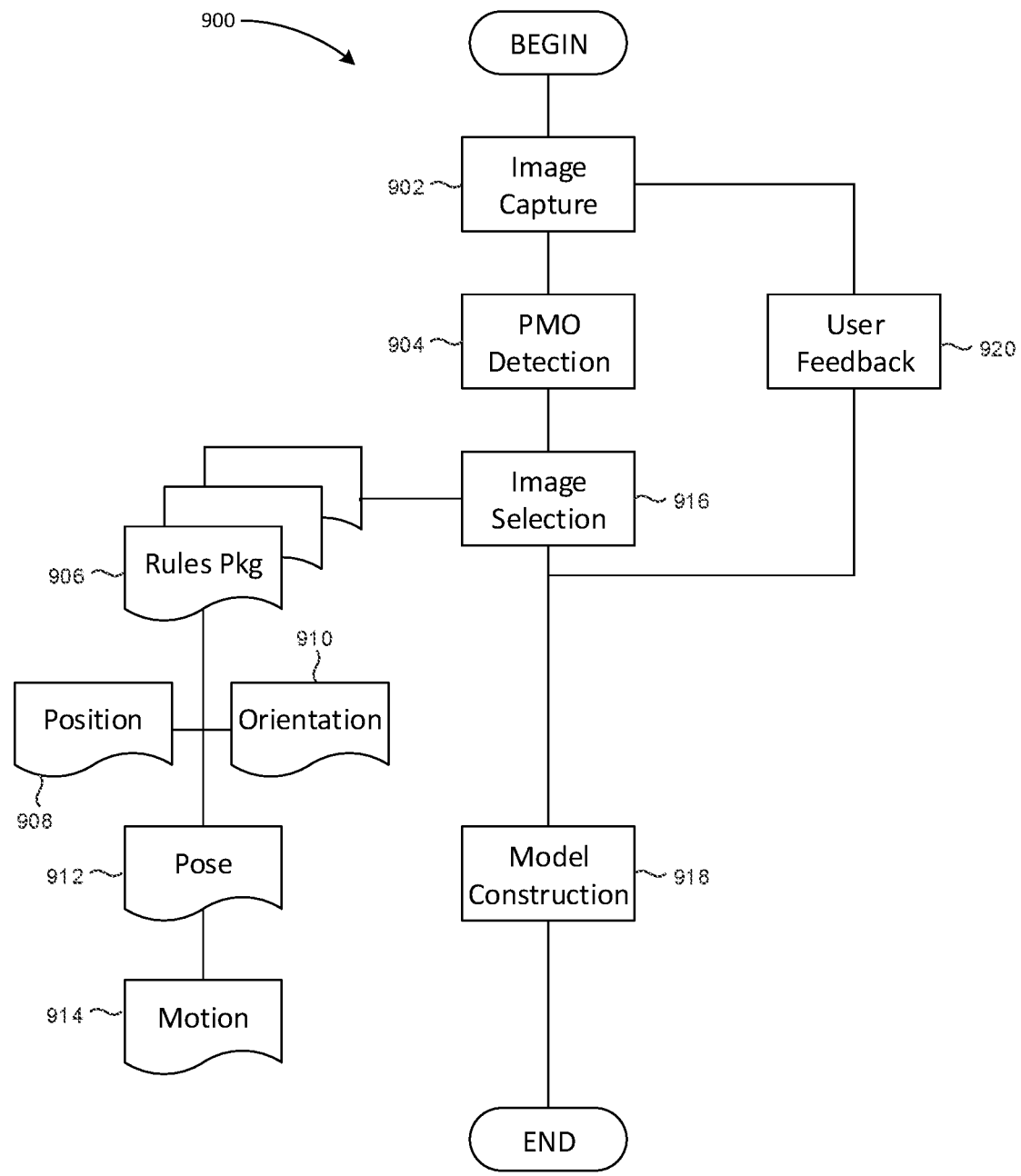
FIG. 9 shows a flowchart depicting an illustrative process for capturing images of an object using an image capture device.

Referring now to FIG. 9, shown is a flowchart of an illustrative process 900 for capturing images of an object with optimized scanning using sensor fusion. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

An image capture device, for example an HMD device 104 as discussed above, includes an image sensor 306. Using the image sensor 306, a plurality of images of an object 802 is captured in step 902. Contemporaneously with the capture of each image, one or more of a position, motion, or orientation (PMO) of the image capture device are detected using, for example, one or more of GPS subsystem 316, motion sensors 318, and/or outward facing image sensors 306, collectively in step 904. A rules package 906 is established pertaining to the selection of images from among those captured in step 902. The rules package 906 can include rules related to the PMO of the HMD device 104. For example, position rules 908 direct a desired position of the HMD device for a capture of one or more images. Similarly, orientation rules 910 pertain to a desired orientation of the HMD device 104. Position rules 908 and orientation rules 910 may be combined to define pose rules 912 indicating a desired pose of the object 802.

The rules in the rules package 906 may also include motion rules 914. The motion rules 914 may, for example, define the motion of the image capture device being at or below a predetermined threshold. Application of rules package 906 informs the selection of images, in step 916, from among the plurality of images captured in step 902. The images selected in step 916 can be utilized in the construction of a computational model of the object 802, as performed in step 918. An exemplary process for model construction is described above with reference to FIG. 7 and its accompanying description.

In some implementations, the PMO data captured in step 904 may be used in a feedback loop. Feedback based upon the PMO data captured in step 904 and the application of the rules package 906 in image selection in step 916 can be returned to a user 102 of the HMD device 104 in step 920. Such feedback at step 920 may serve to guide the user 102 in operation of the HMD 104 or other image capture device to facilitate the capture of images in step 902 that are consistent with the rules package 906.

In another illustrative example of optimized object scanning using sensor fusion, the feature points on the object being reconstructed can be used to optimize the camera pose. Those feature points can be derived from the images of the object, for example from depth images or stereo correspondence of object features. If the object is motionless with respect to the background, all features from the sequence of images can be useful for this process. If, however, the object is abruptly reoriented (e.g., translated or rotated) between successive images, novel images of the object taken thereafter will generate features which are inconsistent with the model of feature locations from prior images. In conventional scanning techniques, a new complete scan of the object would typically have to be performed from the point of the reorientation, adding time to the process.

With the present optimized object scanning, it is possible to detect that the object has changed orientation with respect to the coordinate frame within which the scanning system is tracked. When an object is reoriented during scanning, only features on the object itself are moved and features of the environment stay in the same place. Identifying features that have remained consistent across the scan lets them be classified as "background features." Accordingly, background features can be segmented out from the 3D object being reconstructed.

The point at which features on the 3D object become inconsistent enables the system to partition pose estimates for the 3D model into groups with one group for each reorientation of the object. For each set of features, the relative orientation to other poses can be calculated using an iterative closest point (ICP) algorithm, or other similar techniques, including patch-based feature matching. Having calculated the reorientation of each pose from each group, a direct linear transform of the correspondences between them is possible, taking the known intrinsic characteristics of the camera, to obtain the rotation and/or translation from the pose of one group to another. Once the multiple orientations are determined, the features can be fused together to get a single, high quality model.

Figure 10:
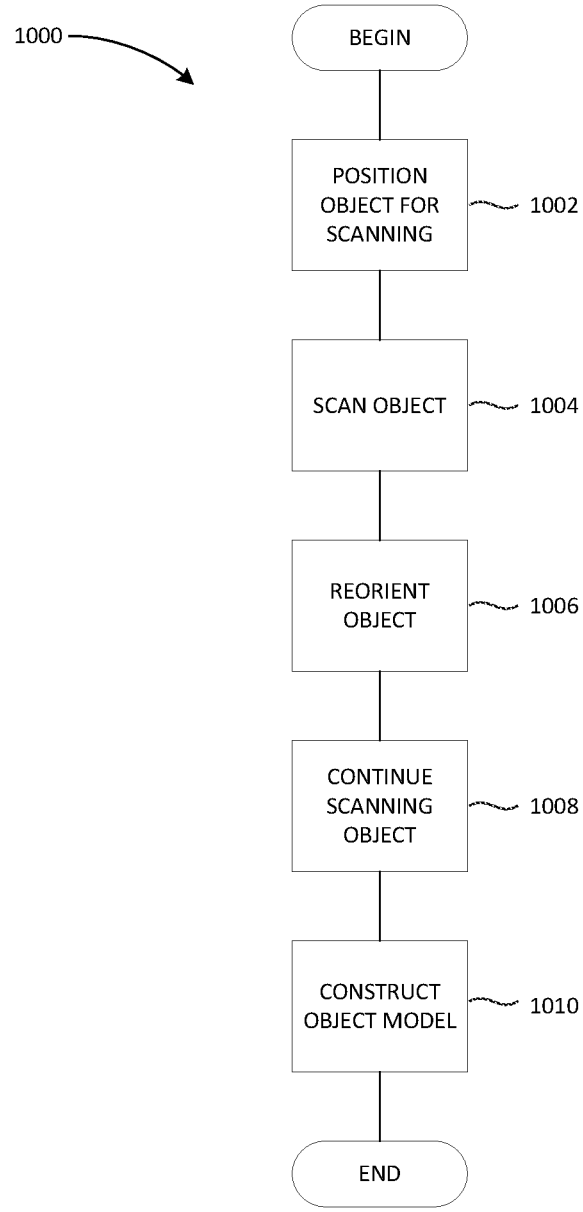
FIG. 10 shows a flowchart depicting and illustrative process for detecting that an object being scanned has changed orientation with respect to the coordinate frame within which the scanning system is tracked.

Referring now to FIG. 10, depicted is a flowchart of an illustrative process 1000 for detecting that an object being scanned has changed orientation with respect to the coordinate frame within which the scanning system is tracked. In step 1002, a user places a tangible object to be scanned in a real world environment. The object is scanned, in step 1004, for example by taking multiple images of the object from multiple vantage points, using in some instances an HMD device or other suitable device, and optionally, with the guidance of a user interface.

At some point during or after the object scanning 1004, the object is repositioned, in step 1006. The reposition can be a rotation or translation of the object, perhaps by the user in some instances, or by some other agency in others. Rather than needing to begin a new scan of the reoriented object from its new position, the user can continue with the scan, in step 1008, without regard to the reorientation. As in illustrative examples discussed above, user feedback through the user interface can guide the scanning, including references to a detected reorientation. Optionally, the scanning continuation in step 1006 may include a full second scan of the reoriented object, to take advantage of surfaces exposed by the reorienting, and include those newly exposed surfaces in the computational model of the object. Taking the image data from the scans, a 3D reconstruction of the object with all surfaces (including, for example, both top and bottom) may be reconstructed, in step 1010. The object reconstruction in step 1010 may include removing the points from the captured images used for the 3D reconstruction that are determined to be static or which are from the background environment.

Various exemplary embodiments of the present optimized object scanning using sensor fusion are now presented by way of illustration and not as an exhaustive list of all embodiments. An example includes a method of capturing images of an object using an image capture device having a position sensor configured to detect a location of the image capture device within a physical environment, the method comprising: using an image sensor disposed in the image capture device, capturing a plurality of images of a subject in the physical environment from a plurality of vantage points; using the position sensor of the image capture device, detecting a position, motion, or orientation of the image capture device within the physical environment contemporaneously with the capture of each of the plurality of images; and selecting a subset of the plurality of captured images from which to construct a three-dimensional computational model of the object, the selecting based on the detected position, motion, or orientation of the image capture device at each image capture location.

In another example, the method further comprises selecting the subset of the plurality of images based on a detected position nearest to one or more predetermined poses of the object. In another example, the method further comprises selecting the subset of the plurality of images based on a detected orientation nearest to one or more predetermined poses of the object. In another example, the method further comprises selecting the subset of the plurality of images based on a detected motion of the image capture device being at or below a predetermined threshold. In another example, the method further comprises: exposing a user interface in communication with the image capture device that is configured to guide a user of the image capture device to control one or more of the position, motion, or orientation of the image capture device to facilitate the capture of images. In another example, the method further comprises using data from the position sensor of the image capture device to guide the user. In another example, the method further comprises: identifying points in the plurality of images that are consistently located across all images as background points; and filtering points in the plurality of images to remove background points from use in construction of a three-dimensional computational model of the object. In another example, the method further comprises: examining the filtered points to determine positional discrepancies in features of the object that are inconsistent with the detected position, motion, or orientation of the image capture device within the physical environment contemporaneously with the capture of each of the plurality of images; segmenting the plurality of images into groups divided by the appearance of the positional discrepancies; and resolving the positional discrepancies to form a coherent computational model of the object based on the filtered points having background points removed.

A further example includes a device operative to perform object scanning using sensor fusion, comprising: an outward-facing image sensor operative to capture images of a scene in a space; a position sensor operative to detect one or more of a position, motion, or orientation of the device within the space; one or more processors; a data storage system, operative to store images from the outward-facing image sensor, and to store position, motion, or orientation data from the position sensor; and a machine-readable memory device operative to store instructions, which when executed cause the one or more processors to capture a plurality of images of the scene from respective positions within the space, detect a position, motion, or orientation of the device within the space simultaneously with the capture of each of the plurality of images of the scene, discard one or more of the plurality of captured images based on the detected position, motion, or orientation of the device at a respective capture location.

In another example, the outward facing image sensor comprises at least one of a two-dimensional image sensor, a stereoscopic image sensor, and a depth sensor. In another example, the device further comprises a user interface providing at least one of an auditory, visual, or haptic feedback to a user and being responsive to verbal, tactile, or gestural input by the user. In another example, the position sensor comprises one of tracking camera, inertia sensor, magnetic 6-degrees-of-freedom position sensor; a lighthouse-based laser-scanning system, and synchronized photodiodes on the object being tracked. In another example, the device is incorporated in a head mounted display device. In another example, the instructions cause the one or more processors to construct a three-dimensional model using captured images other than the discarded images. In another example, the instructions cause the one or more processors to utilize one or more of the detected position, motion, or orientation of the device as an initial condition for determining a transform of the captured images. In another example, the device further comprises an extended field of view (FOV) image sensor having an FOV that exceeds the image capture sensor in which the extended FOV image sensor is configured to determine poses for the captured images.

A further example includes a machine-readable memory device operative to store instructions which, when executed by one or more processors disposed in an electronic device, cause the electronic device to: perform object scanning by capturing a plurality of images of an object from a respective plurality of vantage points using a first camera disposed in the electronic device; determine object poses for the scanning using a second camera disposed in the electronic device that has an extended field of view relative to the first camera; generate world tracking metadata for the electronic device at each vantage point; and utilize the world tracking metadata to combine a subset of the plurality of captured images into a three-dimensional model of the object.

In another example, the first camera has higher angular resolution or is configured to capture an increased level of detail relative to the second camera and the tracking metadata is generated using one or more of tracking camera or inertia sensor incorporated in the electronic device. In another example, the instructions cause the electronic device to generate depth maps from captured images for each vantage point. In another example, the instructions cause the electronic device to operate the first camera to capture images at evenly-spaced vantage points so as to minimize differences in error characteristics in the generated depth maps.

Based on the foregoing, it may be appreciated that technologies for implementing optimized object scanning using sensor fusion have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed:

1. A method of operating an image capture device to capture two-dimensional images of an object in a physical environment, the method comprising:
    capturing two-dimensional images of the object with the image capture device from a plurality of vantage points;
    using at least one sensor associated with the image capture device to detect information about one or more of a position, motion, or orientation of the image capture device in the physical environment at one or more of the vantage points;
    determining object poses from the two-dimensional images; and
    using the detected information about the image capture device at the one or more of the vantage points for selecting object poses to transform object features in the captured two-dimensional images into a three-dimensional computational model of the object.

2. The method of claim 1 further comprising calculating an object pose from a captured two-dimensional image in which the selecting comprises discarding an object pose responsively to disagreement between the calculated object pose and an object pose that is determined from the detected information.

3. The method of claim 1 further comprising providing the selected object poses to a process configured for constructing the three-dimensional model from object features in the captured two-dimensional images.

4. The method of claim 1 further comprising operating the image capture device to capture the two-dimensional images of the object responsively to detected motion of the image capture device being at or below a predetermined threshold.

5. The method of claim 1 further comprising:
    exposing a user interface in communication with the image capture device that is configured to guide a user of the image capture device to control one or more of the position, motion, or orientation of the image capture device to capture the two-dimensional images of the object.

6. The method of claim 5 further comprising
    using detected information about the image capture device at the one or more of the vantage points to guide the user during operation of the image capture device.

7. The method of claim 1 further comprising:
    identifying background points in the plurality of two-dimensional images that are consistently located across substantially all the captured two-dimensional images as background points; and
    filtering the identified background points from use in construction of a three-dimensional computational model of the object.

8. The method of claim 7 further comprising:
    examining the filtered points to determine positional discrepancies in object features of the object that are inconsistent with the detected position, motion, or orientation of the image capture device within the physical environment contemporaneously with the capture of each of the plurality of images;
    segmenting the plurality of images into groups divided by the appearance of the positional discrepancies; and
    resolving the positional discrepancies to form a coherent computational model of the object based on the filtered points having background points removed.

9. A device operative to perform object scanning through application of sensor fusion, comprising:
    an image sensor operative to capture two-dimensional images of a scene in a three-dimensional space;
    at least one tracking sensor operative to detect supplemental information comprising one or more of a position, motion, or orientation of the device within the three-dimensional space;
    one or more processors;
    a data storage system, operative to store images from the image sensor, and to store the supplemental information from the tracking sensor; and
    a machine-readable memory device operative to store instructions, which when executed, cause the one or more processors to
    operate the at least one tracking sensor to detect the supplemental information for the device within the three-dimensional space,
    apply sensor fusion by which the detected information from the tracking sensor is utilized to operate the image sensor to capture two-dimensional images of the scene at a selected one of position, motion, or orientation of the device within the three-dimensional space.

10. The device of claim 9 wherein the image sensor comprises at least one of a two-dimensional image sensor, a stereoscopic image sensor, or a depth sensor.

11. The device of claim 9 further comprising a user interface providing at least one of an auditory, visual, or haptic feedback to a user and being responsive to verbal, tactile, or gestural input by the user.

12. The device of claim 9 wherein the tracking sensor comprises one of tracking camera, inertia sensor, magnetic 6-degrees-of-freedom position sensor, a lighthouse-based laser-scanning system, or synchronized photodiodes on the object being tracked.

13. The device of claim 9 in which the image sensor is operated to capture two-dimensional images at selected locations that are substantially evenly spaced about the object in the three-dimensional space.

14. The device of claim 9 wherein the instructions cause the one or more processors to construct a three-dimensional model from captured two-dimensional images using the one or more of detected position, motion, or orientation of the device as an initial condition for determining a transform of the captured two-dimensional images.

15. The device of claim 9 wherein the instructions cause the one or more processors to utilize one or more of detected position, motion, or orientation of the object to control exposure duration of the image sensor.

16. The device of claim 9 further comprising an extended field of view (FOV) camera having an FOV that exceeds the image sensor in which the extended FOV camera provides data to determine object poses.

17. A machine-readable memory device operative to store instructions which, when executed by one or more processors disposed in an electronic device, cause the electronic device to:

capture a plurality of images of an object from a respective plurality of vantage points using a camera disposed in the electronic device that is configured to capture two-dimensional images with respect to world coordinates that describe at least one of position, motion, or orientation of the camera;

generate world tracking metadata for the electronic device at one or more of the vantage points;

perform object pose optimization for transforming captured images into a three-dimensional model of the object using the world tracking metadata to provide an initial point of optimization; and enable construction of the three-dimensional model of the object using the optimized object poses.

18. The machine-readable memory device of claim 17 in which the instructions further cause the electronic device to use an extended field of view (FOV) camera disposed in the electronic device in which the camera has higher angular resolution or is configured to capture an increased level of detail relative to the extended FOV camera and the extended FOV camera is utilized to determine object poses.

19. The machine-readable memory device of claim 17 in which the instructions cause the electronic device to use the world tracking metadata is utilized to determine image-by-image pose variations in response to which object poses are discarded from use in the three-dimensional model.

20. The machine-readable memory device of claim 19 in which the electronic device further comprises a depth camera and in which the instructions cause the electronic device to use data from the depth camera to determine which object poses are discarded from use in the three-dimensional model.

* * * * *